United States Patent [19]
Pirrie et al.

[11] 3,917,351
[45] Nov. 4, 1975

[54] TUNNELLING MACHINES

[75] Inventors: Norman Duncan Pirrie; John Bland, both of London, England

[73] Assignee: Sir Robert McAlpine & Sons Limited, London, England

[22] Filed: Apr. 1, 1974

[21] Appl. No.: 456,726

[30] Foreign Application Priority Data
Apr. 16, 1973 United Kingdom............... 18253/73

[52] U.S. Cl..................................... 299/90; 299/85
[51] Int. Cl.². ........................................ B65D 65/00
[58] Field of Search ............ 299/90, 85, 79, 33, 31; 61/84, 85

[56] References Cited
UNITED STATES PATENTS

| | | | |
|---|---|---|---|
| 2,134,478 | 10/1938 | Hollingsworth.................... | 299/33 X |
| 3,075,591 | 1/1963 | Pirrie ................................. | 61/85 X |
| 3,382,002 | 5/1968 | Tabor .................................. | 299/33 |
| 3,439,758 | 4/1969 | Petersen ............................ | 299/90 X |
| 3,467,439 | 9/1969 | Bolotin et al. ........................ | 299/90 |
| 3,561,223 | 2/1971 | Tabor ............................... | 299/33 X |

Primary Examiner—Frank L. Abbott
Assistant Examiner—Richard E. Favreau
Attorney, Agent, or Firm—Edward F. Connors

[57] ABSTRACT

A cutting head for a tunnelling machine which extends across the full width of a tunnel to be cut and has a bulkhead extending across the head except for at least one slot through which spoil passes during cutting, the slot being substantially radial and means being provided to close the slot when desired (e.g. if the tunnel face becomes unstable), the said means comprising two cutting blades, one for each direction of rotation said cutting blades being independently movable between a cutting position where the slot is open and an inoperative position where the slot is sealed off by the blades.

5 Claims, 4 Drawing Figures

TUNNELLING MACHINES

BACKGROUND OF THE INVENTION

Field of the Invention

The invention relates to tunnelling machines, and in particular to cutting heads therefor.

SUMMARY OF THE INVENTION

The invention provides a cutting head for a tunnelling machine, which cutting head extends across the full width of a tunnel to be cut and has a bulkhead extending across the head except for at least one slot through which spoil passes during the cutting, wherein the slot is substantially radial and means are provided to close the slot when desired, said means comprising two cutting blades one for each direction of rotation, said cutting blades being independently movable between a cutting position where the slot is open and an inoperative position where the slot is sealed off by the blades.

The blade may be pivotally connected to an edge of the slot and may be movable by means of an hydraulic ram.

There may be a plurality of slots and blades the blades all being operable from a single remote control.

The invention includes a tunnelling machine having a cutting head as just described.

DESCRIPTION OF THE PREFERRED EMBODIMENT

Figure 1:
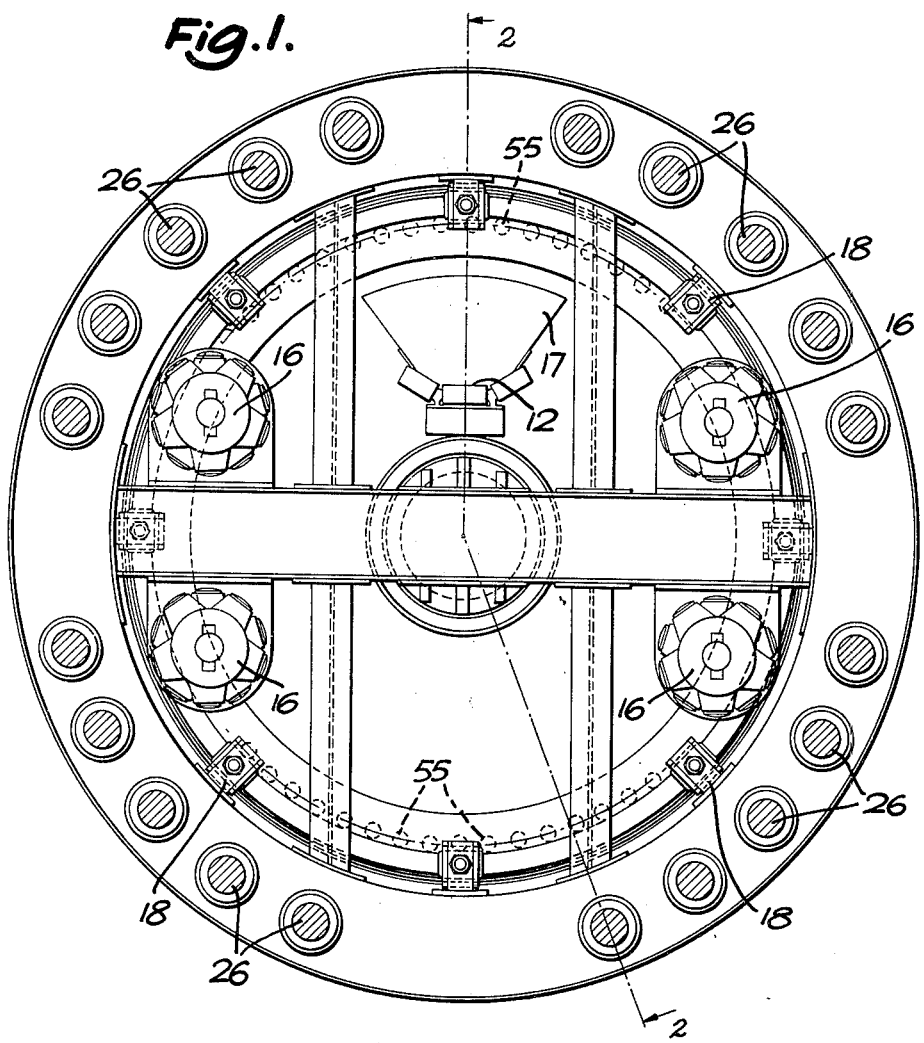
FIG. 1 is a sectional view, by way of example, of a tunnelling machine looking towards the cutting face of that machine and along the line 1—1 of FIG. 2.
Figure 2:
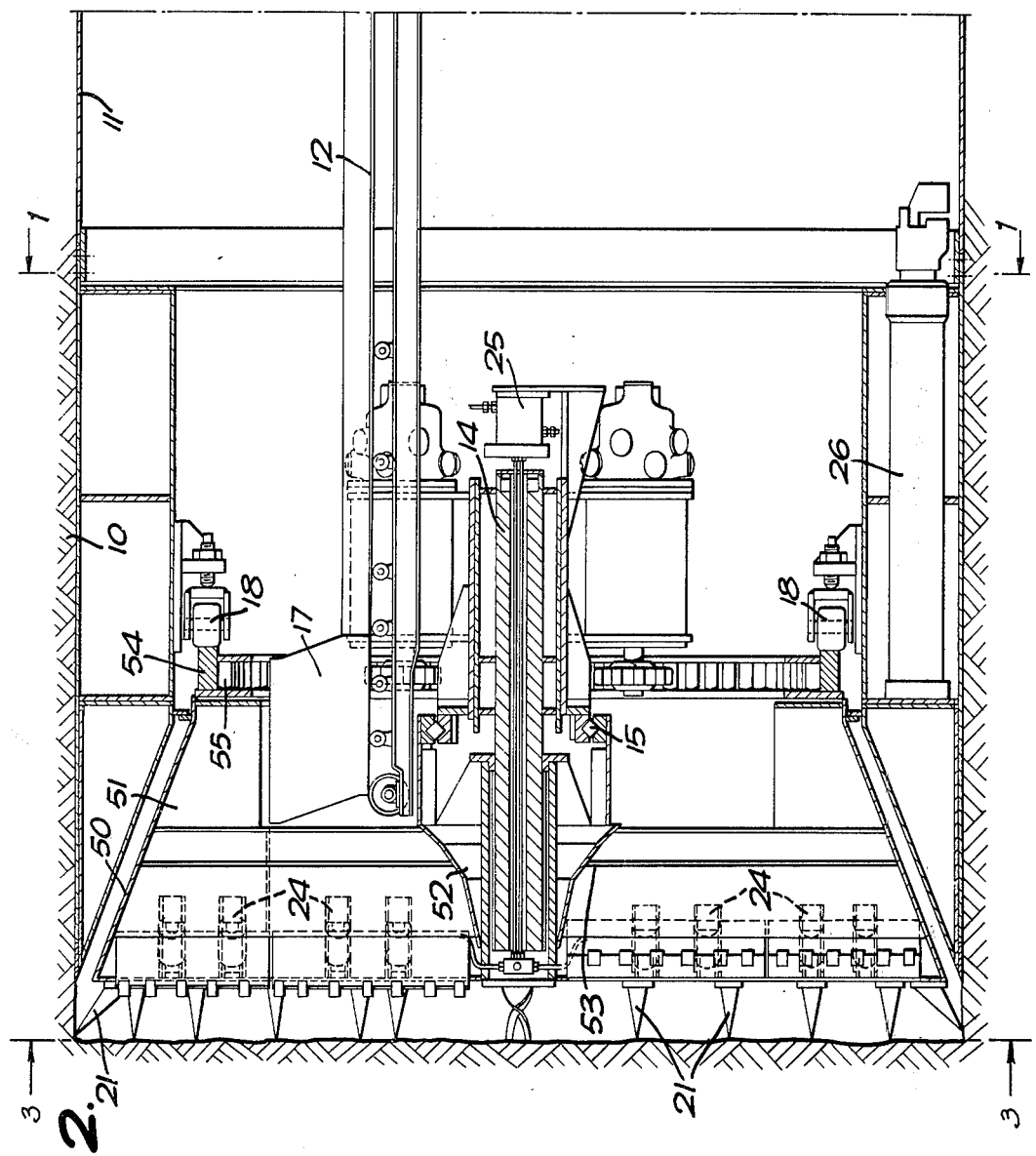
FIG. 2 is a section along the line 2—2 of FIG. 1 with the head arranged in one configuration.
Figure 3:
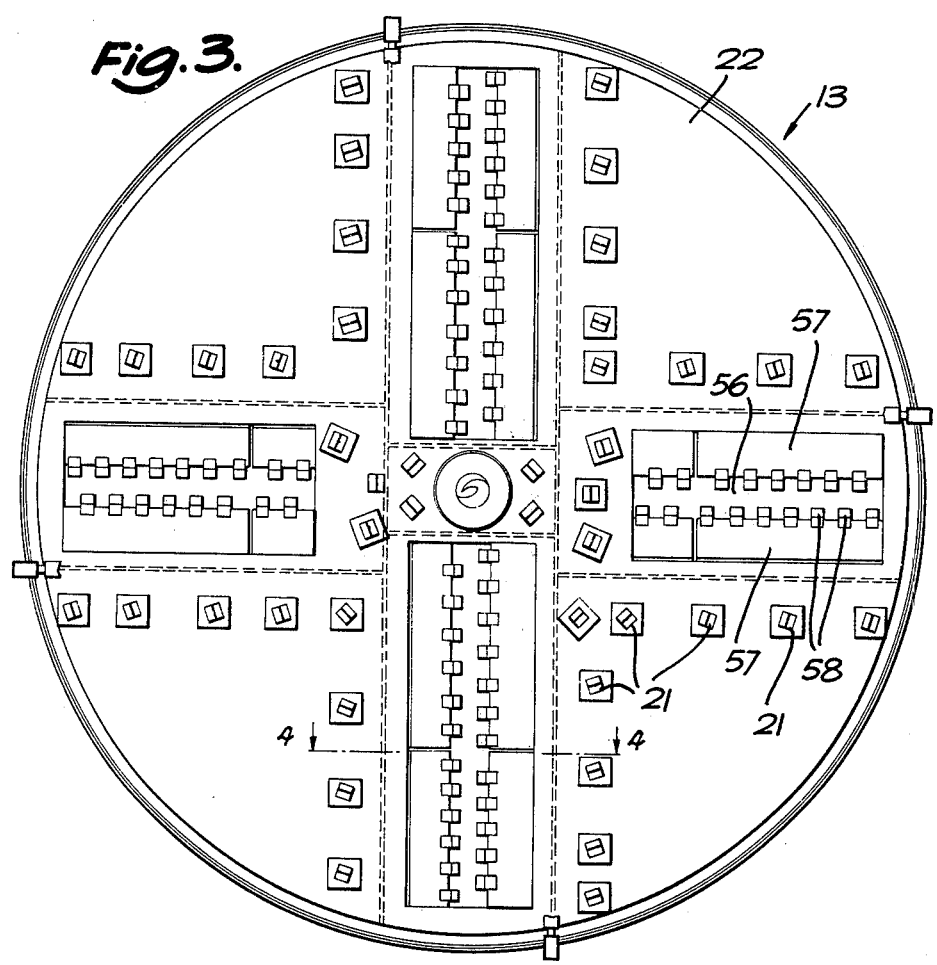
FIG. 3 is a view taken substantially along the line 3—3 in FIG. 2, showing a cutting head with a closed face and drag picks suitable for soft ground.

The drawings show a tunnelling machine having a closed face cutting head with drag picks 21 suitable for use when tunnelling through soft ground.

The tunnelling machine has a shield 10 with a long tail 11, and a spoil removing conveyor 12. A cutting head generally designated 13 is freely rotatable on and supported by a dead shaft 14.

The head comprises a frusto-conical outer plate 50 with partitions 51 which divide the head into a ring of spoil collecting buckets as described in our earlier U.S. Pat No. 3,075,591 the buckets being arranged to deliver spoil into a hopper 17 and thus to the conveyor 12. The head has a central hub 52 attached to the plate 50 by means of four equally spaced spokes 53. A thrust ring 54 is provided in the head and the thrust on the head is taken partly by the thrust ring engaging eight thrust rollers 18 spaced around the shield and partly by a central thrust roller bearing 15 between the hub and a support structure rigid with the shield 10.

Within the thrust ring 54 is a ring gear 55 and the head is rotated by four hydrostatic motors 16 which engage the ring gear.

The front face of the cutting head is provided with a bulkhead 22 with four radial openings 56. In each opening are pivoted cutting blades 57 which may be provided with cutting teeth 58. As can be seen from FIG. 4 each blade is pivotable about an axis 59 by means of a double acting hydraulic ram 24, which is supplied from a rotary distributor 25.

Each bulkhead is provided further with drag picks 21 and the soft ground is loosened by the drag picks and cut through by the blades 57 and the teeth 58.

Figure 4:
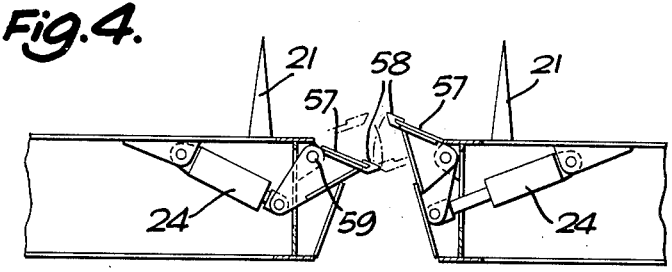
FIG. 4 is a scrap section on the line 4—4 in FIG. 3.

In operation the machine is operated by driving the shield (and the head) forward by rams 26 acting on the shield and the tunnel lining, and the head is rotated in either direction by the motors 16. The blades 57 are set to a desired angle by the rams 24 and, as shown in FIG. 4, one set of blades is set to cut and the other set is retracted, depending upon the direction of head rotation.

Material excavated passes in through the bulkhead 22 through the gaps between the pairs of blades and falls into the rotating buckets formed in the head. The buckets lift the material up, let it fall in the hopper 17 and then the material is fed rearwards by the conveyor 12.

An advantage of this machine is that the blades 57 and the bulkhead 22 are so constructed that the blades can be positioned to seal the tunnel if the machine meets unstable ground conditions.

Furthermore it will be seen that the blades 57 are adjustable to set the slots formed between the blades at any desired angle to make different depths of cut and to allow different amounts of spoil to pass through the slots.

The machine described can be adjusted very simply for use in harder ground if such is encountered. The drag picks can be substituted by roller cutters and if the outermost rollers are arranged to cut a larger diameter hole than the shield the machine can be steered by any suitable means, for example, by addition of a sole plate to the front of the shield and means to relocate the shield body in the enlarged hole. The tail 11 would probably also be removed.

In hard ground all the cutting would be done by the roller cutters and the blades 57 would be used only to scoop away the spoil.

We claim:

1. In a tunnelling machine which includes a cylindrical shield, a cutting head rotatably mounted at the front end of the shield for rotary cutting movement, and means drivingly connected to the cutting head for rotating the head in either direction of rotation and in which the cutting head extends across the full width of a tunnel to be cut and comprises a bulkhead mounted at the front of the cutting head and extending across the cutting head and having at least one substantially radial slot through which spoil passes during the cutting movement; the improvement which comprises a first and second cutting blade pivotally mounted at opposed edges of the slot for pivotal movement about substantially radial axes between a first position where the first blade is inclined towards the tunnel face and the second blade is inclined away from the tunnel face for cutting in one direction of rotation, and a second position where both blades lie in the plane of the bulkhead for sealing off the slot and a third position where said second blade is inclined towards the tunnel face and said first blade is inclined away from the tunnel face for cutting in the other direction of rotation, and means for moving the cutting blades to the said three positions.

2. The invention of claim 1 wherein the cutting blades are parallel and spaced apart in the first and third positions to provide a guiding passage for the spoil.

3. The invention of claim 1 wherein there are four substantially radial slots equiangularly spaced in the bulkhead and eight cutting blades and wherein at least one hydraulic ram is connected between the cutting head and each blade for moving the cutting blades through the first, second and third positions.

4. The invention of claim 1 wherein a plurality of drag picks are rigidly attached to the cutting head for cutting a tunnel in soft ground.

5. A tunnelling machine for boring a circular tunnel comprising, a cylindrical shield capable of supporting the wall of a tunnel to be bored; a cutting head rotatably mounted at the front part of the shield for rotary cutting movement and adapted to extend across the full width of the tunnel; a plurality of reversible hydrostatic motors mounted on the shield drivingly connected to the cutting head for rotating the cutting head in either direction of rotation; a plurality of hydraulic rams mounted on the shield for reacting against fixed means in the tunnel to advance the machine; a bulkhead mounted at the front of the cutting head and extending across the head and having four equiangularly spaced substantially radial slots through which spoil passes during the cutting movement; two cutting blades mounted at each slot, the cutting blades being pivotally mounted on opposed longitudinal edges of the slot for pivotal movement about substantially radial axes between a first position where one blade is inclined towards the tunnel face and the other blade is inclined away from the tunnel face for cutting in one direction of rotation, a second position where both blades lie in the plane of the bulkhead for sealing off the slot and a third position where said other blade is inclined towards the tunnel face and said one blade is inclined away from the tunnel face for cutting in the other direction of rotation; and a plurality of hydraulic rams, at least one such ram being connected between the cutting head and each cutting blade for independently effecting the pivotal movements.

* * * * *